United States Patent
Tang et al.

(10) Patent No.: US 9,584,725 B2
(45) Date of Patent: Feb. 28, 2017

(54) METHOD AND TERMINAL DEVICE FOR SHOOTING CONTROL

(71) Applicant: Xiaomi Inc., Beijing (CN)

(72) Inventors: Mingyong Tang, Beijing (CN); Yijun Liu Hua, Beijing (CN); Xiao Liu, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 14/585,215

(22) Filed: Dec. 30, 2014

(65) Prior Publication Data

US 2015/0350546 A1 Dec. 3, 2015

Related U.S. Application Data

(63) Continuation of application No. PCT/CN2014/089306, filed on Oct. 23, 2014.

(30) Foreign Application Priority Data

Jun. 3, 2014 (CN) .......................... 2014 1 0242824

(51) Int. Cl.
H04N 5/232 (2006.01)

(52) U.S. Cl.
CPC ..... *H04N 5/23245* (2013.01); *H04N 5/23212* (2013.01)

(58) Field of Classification Search
CPC .................. H04N 5/23245; H04N 5/23212
See application file for complete search history.

(56) References Cited

U.S. PATENT DOCUMENTS

| | | | |
|---|---|---|---|
| 2009/0201424 A1* | 8/2009 | Ueda | H04N 5/45 348/565 |
| 2010/0007748 A1* | 1/2010 | Suzuki | H04N 5/23219 348/208.14 |
| 2010/0110178 A1* | 5/2010 | Isobe | G02B 7/36 348/135 |
| 2012/0176505 A1* | 7/2012 | Kim | H04N 5/23219 348/222.1 |
| 2013/0258167 A1* | 10/2013 | Gum | H04N 5/23212 348/349 |
| 2015/0022710 A1* | 1/2015 | Miyajima | H04N 5/23212 348/349 |

FOREIGN PATENT DOCUMENTS

| | | |
|---|---|---|
| CN | 101170683 A | 4/2008 |
| CN | 101191979 A | 6/2008 |
| CN | 102478743 A | 5/2012 |
| CN | 102970485 A | 3/2013 |

(Continued)

OTHER PUBLICATIONS

"International Search Report for PCT/CN2014/089306".
The extended European Search Report of 15162860.9.

*Primary Examiner* — Timothy J Henn
(74) *Attorney, Agent, or Firm* — Jun He Law Offices P.C.; James J. Zhu

(57) ABSTRACT

The disclosure provides a method and a terminal device for shooting control. The method includes: obtaining a moving speed of an object on a shooting screen of the terminal device; determining whether the moving speed is within a preset speed range; and focusing on the object if the moving speed is within the preset speed range.

18 Claims, 6 Drawing Sheets

(56) References Cited

FOREIGN PATENT DOCUMENTS

| | | |
|---|---|---|
| CN | 103327244 A | 9/2013 |
| CN | 103455254 A | 12/2013 |
| CN | 104065878 A | 9/2014 |
| JP | 2001-67583 A | 3/2001 |
| JP | 2005-159674 A | 6/2005 |
| JP | 2005215040 A | 8/2005 |
| JP | 2007-243660 A | 9/2007 |
| JP | 2010021598 A | 1/2010 |
| JP | 2010114547 A | 5/2010 |
| JP | 2010243868 A | 10/2010 |
| JP | 2011211531 A | 10/2011 |
| JP | 2012137675 A | 7/2012 |
| JP | 2013118712 A | 6/2013 |
| KR | 100145436 B1 | 4/1998 |
| KR | 100879266 B1 | 1/2009 |
| WO | 97/33262 A1 | 9/1997 |
| WO | 98/20679 A1 | 5/1998 |
| WO | 2011/043350 A1 | 4/2011 |
| WO | 2013/089190 A1 | 6/2013 |
| WO | 2013/148591 A1 | 10/2013 |

\* cited by examiner

METHOD AND TERMINAL DEVICE FOR SHOOTING CONTROL

CROSS-REFERENCE TO RELATED APPLICATIONS

This application is a Continuation Application of International Application No. PCT/CN2014/089306, filed on Oct. 23, 2014, which is based upon and claims priority to Chinese Patent Application No. CN201410242824.X, filed on Jun. 3, 2014, the entire contents of which are incorporated herein by reference.

TECHNICAL FIELD

The present disclosure relates to the field of photographing, and more particularly, to a method and a terminal device for shooting control.

BACKGROUND

With the popularity of mobile devices such as smart phones and tablet computers etc., it has become very convenient to shoot videos and upload the captured videos to a video-sharing website. More and more users are accustomed to shoot videos or pictures through the mobile devices to record everyday things.

In the existing focusing technologies applied to most mobile device applications, some require manual operations, such as tapping on a focusing function, which may require tedious operation steps and a lot of time. While others may refocus after adjusting is automatically repeated on the defocused picture, however, the time of the focus adjustment process is lengthy.

SUMMARY

According to a first aspect of the embodiments of the present disclosure, a method for shooting control in a terminal device is provided. The method includes: obtaining a moving speed of an object on a shooting screen of the terminal device; determining whether the moving speed is within a preset speed range; and focusing on the object if the moving speed is within the preset speed range.

According to a second aspect of the embodiments of the present disclosure, a terminal device is provided. The terminal device includes: a processor; and a memory used to store performable instructions of the processor. The processor is configured to perform: obtaining a moving speed of an object on a shooting screen of the terminal device; determining whether the moving speed is within a preset speed range; and focusing on the object if the moving speed is within the preset speed range.

According to a third aspect of the embodiments of the present disclosure, there is provided a non-transitory computer-readable storage medium having stored therein instructions that, when executed by a processor of a terminal device, causes the terminal device to perform a method for shooting control, the method comprising: obtaining a moving speed of an object on a shooting screen of the terminal device; determining whether the moving speed is within a preset speed range; and focusing on the object if the moving speed is within the preset speed range.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Detailed description of the present disclosure will further be made with reference to drawings in order to make the above objects, technical solutions and advantages of the present disclosure more apparent.

Figure 1:
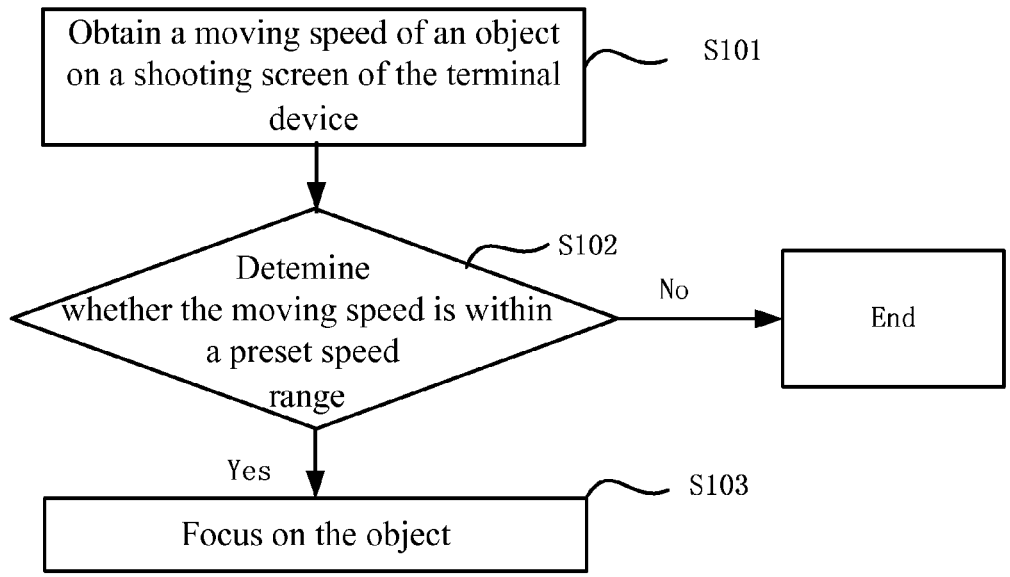
FIG. 1 is a flow chart showing a method for shooting control according to an exemplary embodiment.

FIG. 1 is a flow chart showing a method for shooting control according to an exemplary embodiment. As shown in FIG. 1, the method for shooting control is used in a terminal device, and comprises the following steps.

In step S101, a moving speed of an object on a shooting screen of a terminal device is obtained.

When taking photos of a building or other still objects and a person with controlled poses, once the focus is completed the object on the shooting screen of the terminal device is static, so the captured image is very clear. But in some movement scenarios, for example, taking photos or videos of sportsmen in stadiums, race cars in racing tracks, or moving persons in a wedding, the object to be photographed is moving and the captured image will be fuzzy if photos are taken with a preset focal length. Therefore, firstly, the moving speed of the object on the shooting screen of the terminal device is obtained in this step.

The moving speed of the object on the shooting screen may be a shift speed of the object on the screen of the terminal device, or the moving speed of an entity corresponding to the object on the shooting screen. For example, the moving speed of the entity corresponding to the object on the shooting screen may be directly measured by velocity measurement equipments (such as speed measuring radar); or the moving speed of the object on the screen may be measured firstly, and then the distance between the entity corresponding to the object on the shooting screen and the terminal device is measured, and eventually the moving speed of the entity is obtained through indirect calculation.

In step S102, it is determined whether the moving speed falls within a preset speed range.

The user of the terminal device may set at least one preset speed range in advance, by judging the moving speed of the object to be photographed according to the user's experience of photographing, manually select the preset speed range. In addition, some shooting functions of the terminal device may also be bounded with different preset speed ranges, so that when the user selects a certain shooting function, the corresponding preset speed range is automatically selected, for example, the "portrait" shooting function corresponds to the preset speed range of 3 Km/h to 10 Km/h; the "vehicle" shooting function corresponds to the preset speed range of 20 Km/h to 200 Km/h; and for the cameras installed over roads for catch speeding vehicles, the preset speed range may also be directly set to more than 180 Km/h.

If the moving speed falls into the preset speed range, in step S103, a camera of the terminal device focuses on the described object. Otherwise, the process ends.

The purpose of setting the preset speed ranges is to focus on the object of interest to the user. In the above example, if the user selects the "portrait" shooting function, the camera can only focus on the object with the speed falling into a range of about 3 Km/h~10 Km/h, and high speed vehicles behind persons to be shot will be disregarded. Similarly, the cameras installed over the roads for catching speeding vehicles are only interested in the vehicles with the speed of movement more than the preset speed, but the vehicles, pedestrians or animals with the speed less than the preset speed will be disregarded.

The object with the moving speed falling into the preset speed range is an object of interest to the user through setting the preset speed range; therefore, the camera of the terminal device can directly focus on the object. The step of focusing may include turning the camera lens of the terminal device, and also may include controlling the movement of the terminal device relative to the object, for example the terminal device is installed on a slide rail and the terminal device's movement on the slide rail is controlled.

According to the method provided by this embodiment of the present disclosure, after the moving speed of the object on the shooting screen is obtained, it is determined whether the moving speed falls into the preset speed range according to the moving speed, and the object on the shooting screen is focused if the moving speed falls within the preset speed range.

According to the method, giving that the moving speed of the object on the shooting screen may be served as a feedback and a focus process may be controlled, the camera of the terminal device can automatically follow the object and focus on the object when the object on the shooting screen is moving, so that the focus process maybe more automated and less time consuming.

Compared with related technology, because the focus process takes less time, the camera of the terminal device may capture quality images or scenes promptly during the movement of the object to be photographed.

Figure 2:
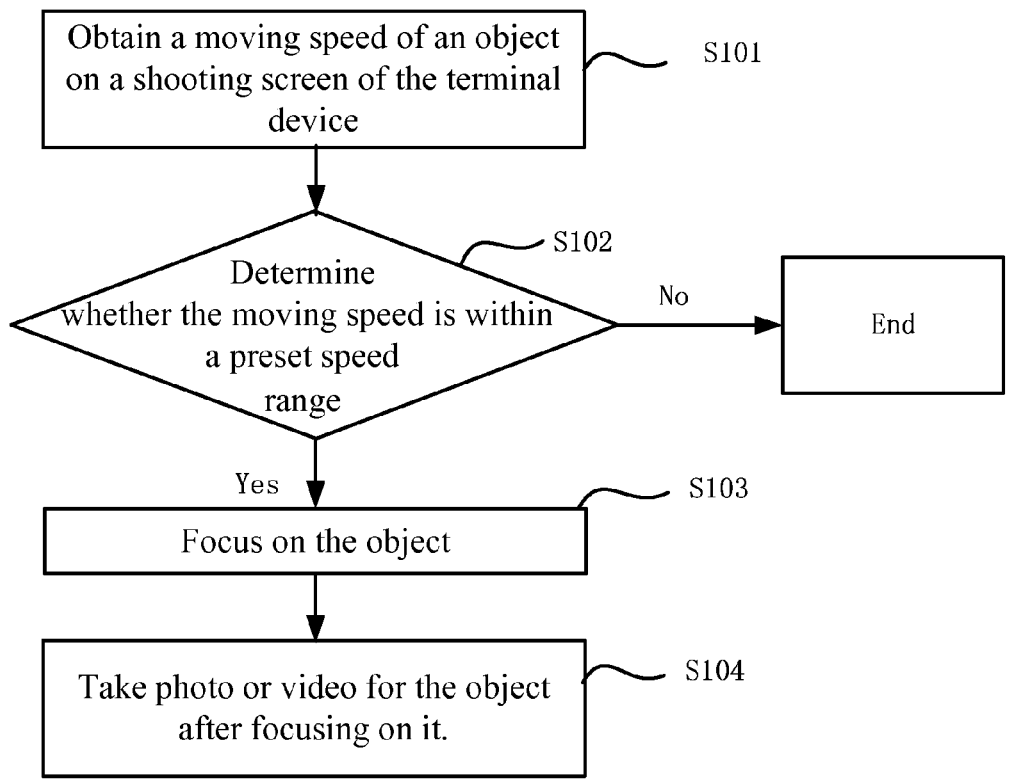
FIG. 2 is a flow chart showing a method for shooting control according to another exemplary embodiment.

In another embodiment of the present disclosure, after step S103, the method can also include the following steps, as shown in FIG. 2.

In step S104, a photo or a video of the object is captured after the object is focused.

In the above step S103, although focusing on the object is completed and the best image or scene during the movement of the object is captured, however, as for photographing, only a preparation stage is finished. Therefore, after step S103, there is also a need to capture photos or videos of the focused object, so that the best image or scene during the movement of the object can be recorded.

Figure 3:
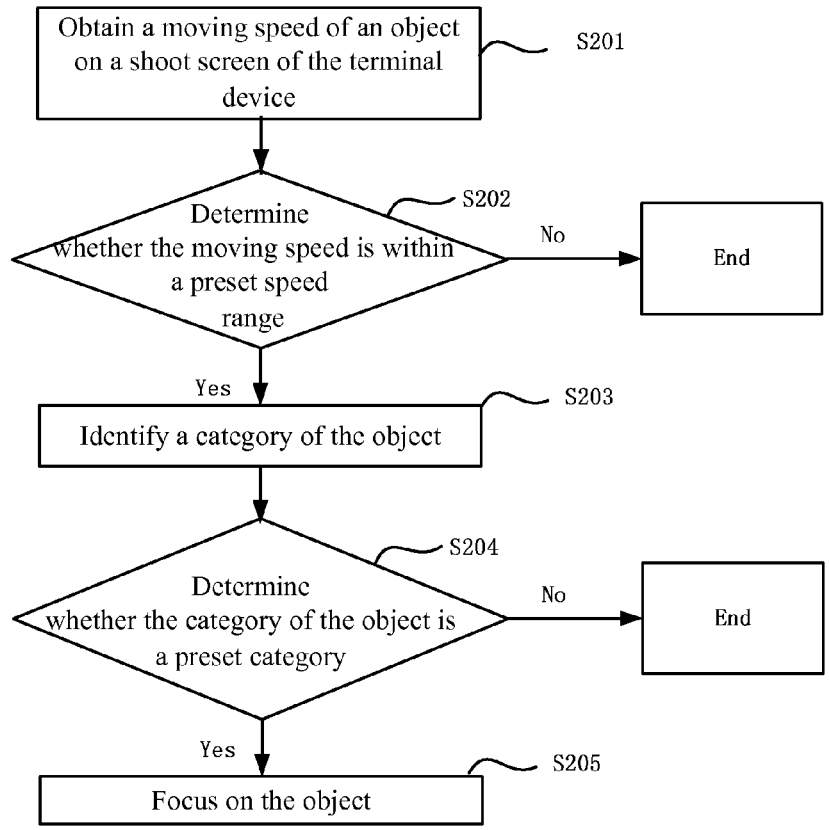
FIG. 3 is a flow chart showing a method for shooting control according to still another exemplary embodiment.

FIG. 3 is a flow chart showing a method for shooting control according to still another exemplary embodiment. As shown in FIG. 3, the method for shooting control is used in a terminal device, and comprises following steps.

In step 201, a moving speed of an object on a shooting screen of the terminal device is obtained.

In step 202, it is determined whether the moving speed falls within a preset speed range.

If the moving speed is within the preset speed range, in step 203, a category of the object is determined. Otherwise, the process ends.

Figure 4:
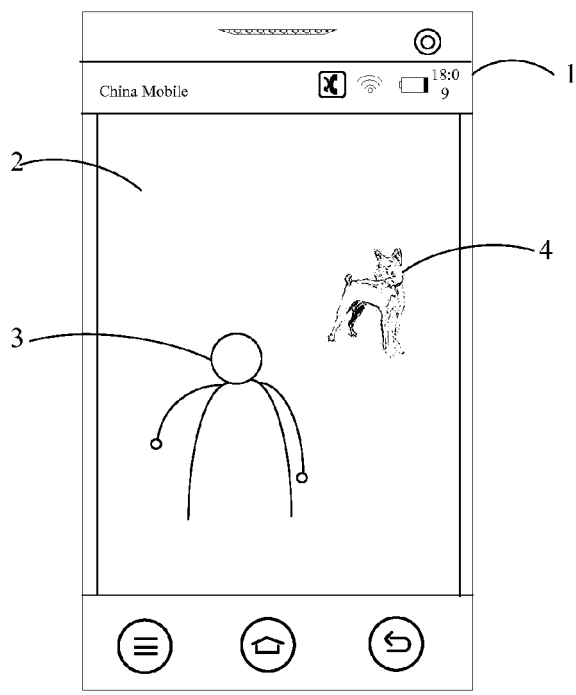
FIG. 4 is a diagram showing a shooting screen according to an exemplary embodiment.

In the embodiment shown in FIG. 1, it has described that the procedure of focusing on the object is performed only if the moving speed of the object falls into the preset speed range, which can exclude the objects with the moving speed out of the preset speed range. However in practical applications, there may be two objects with speed within the preset speed range, for example, when taking photos on a person, a small animal may run into the picture to be photographed, and the moving speeds of the small animal and the person are similar. As shown in FIG. 4, the figure includes a terminal device 1, a shooting screen 2, a person 3 and a dog 4. Because the moving speed of the dog is close to that of the person, two or more objects on the shooting screen 2 need to be focused, and thus the focus process may be failed.

Therefore, in step 203 in the embodiment of the present disclosure, the category of the object can be identified. In an actual identification process, this step can use existing image recognition technology, for example, face recognition technology, etc., to identify the object.

In step 204, it is determined whether the category of the object is a preset category.

The user can set multiple preset categories in advance. Descriptions of the preset category may be referred to descriptions about the preset speed range in the embodiment shown if FIG. 1, which is not repeated here.

If the category of the object is the preset category, then in step 205, a camera of the terminal device will focus on the object.

If the category of the object is not the preset category, the process can directly end. For example, when taking photos of a person, if the person does not move, but a small animal moves on the shooting screen, so it can be determined that the category of the small animal is not the preset category by the category identification, and it can be decided not to perform the adjustment of the focus length.

The method provided by this embodiment of the present disclosure can further identify the category of the object if there are multiple objects of which the moving speeds all meet the requirement on the shooting screen, and focus on the object only when its category is the preset category, so as to make the focus length more accurately.

Figure 5:
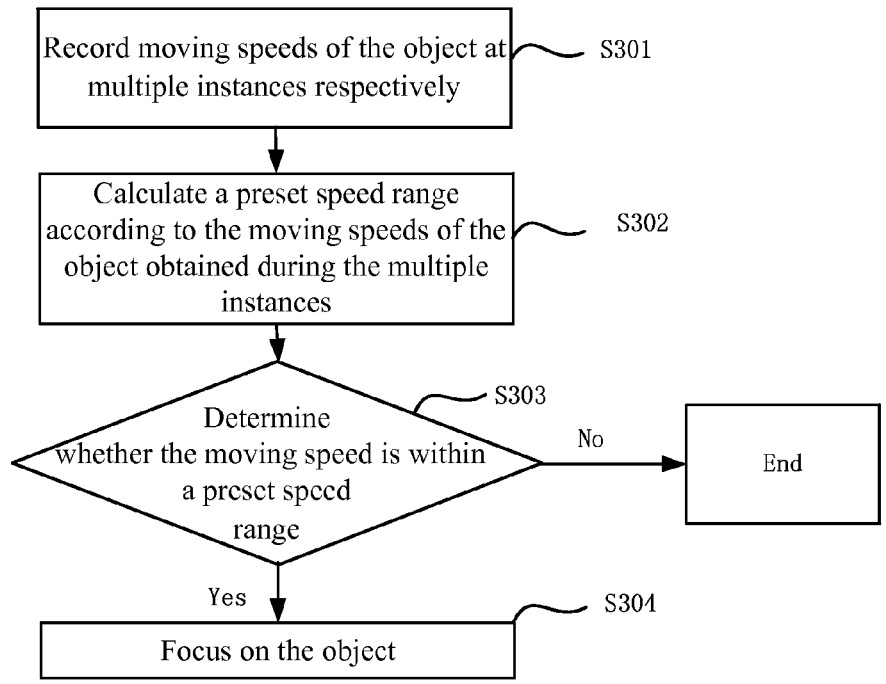
FIG. 5 is a flow chart showing a method for shooting control according to still another exemplary embodiment.

FIG. 5 is a flow chart showing a method for shooting control according to still another exemplary embodiment. As FIG. 5 shown, the method for shooting control is used in a terminal device, and comprises following steps.

In step 301, moving speeds of an object are respectively recorded during multiple instances.

In step 302, a preset speed range is calculated according to the moving speeds of the object obtained during the multiple instances.

In step 303, it is determined whether a moving speed falls within the preset speed range.

If the moving speed falls into the preset speed range, in step 304, a camera of the terminal device focuses on the described object. Otherwise, the process ends.

Figure 6:
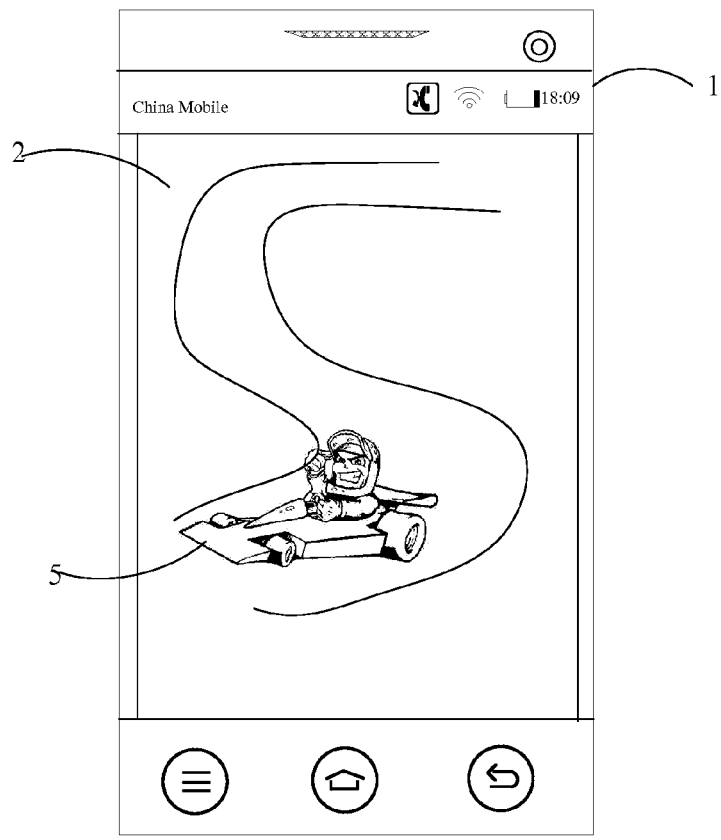
FIG. 6 is a diagram showing a shooting screen according to another exemplary embodiment.

In the above embodiments, the preset speed range is set in advance by the user. In the embodiments of the present disclosure, the moving speed of the object on the shooting screen can also be recorded continuously to calculate the preset speed range according to the recorded moving speeds of the object, which can make the preset speed range be amended according to the moving speed of the object, for example, as for a racing car, the preset speed range can be amended continuously from the starting step to the accelerating step of the racing car. As shown in FIG. 6, the reference number 5 in the figure indicates a racing car; so this method can be applied to an object of which the moving speed is changed greatly, and the object can be always focused on during the movement of the object.

Figure 7:
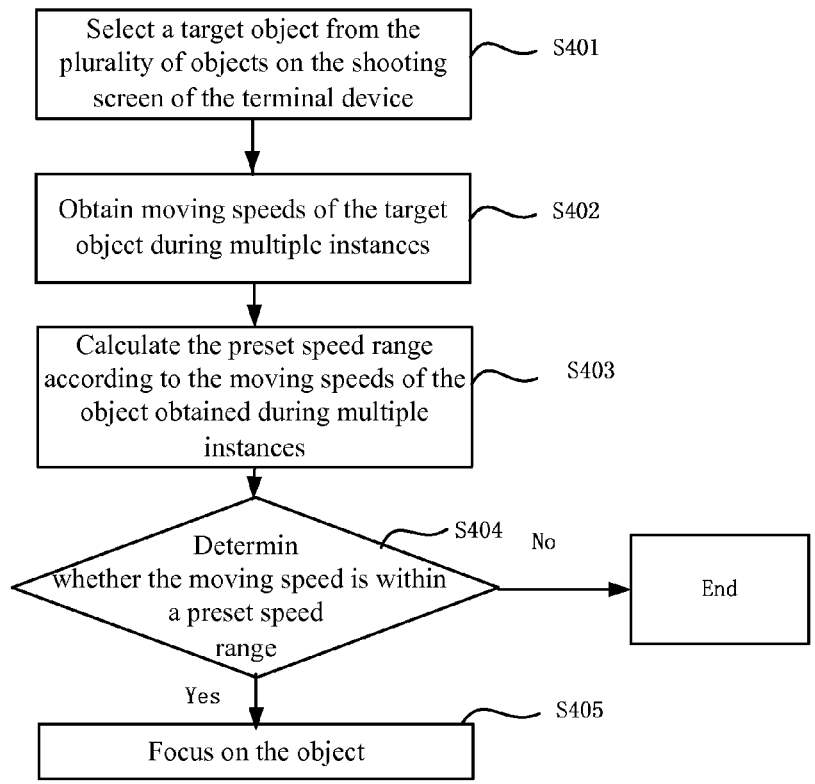
FIG. 7 is a flow chart showing a method for shooting control according to still another exemplary embodiment.

When there is more than one object on the shooting screen of the terminal device, if the method shown in FIG. 5 is implemented, it is necessary to record the moving speeds of the multiple objects, and it is hard to focus on a certain object. Therefore, in the embodiment of the present disclosure, as shown in FIG. 7, the method may include the following steps.

In step 401, a target object is selected from multiple objects on the shooting screen of the terminal device.

Figure 8:
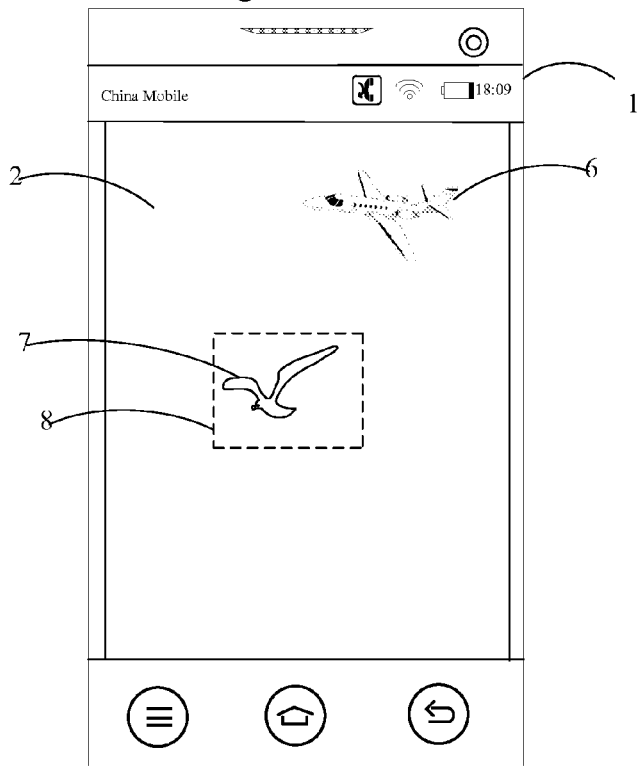
FIG. 8 is a diagram showing a shooting screen according to still another exemplary embodiment.

In this step, a currently focused object on the shooting screen of the terminal device can be selected as the target object. In addition, the target object can be selected by other ways. For example, an object located at the center area of the shooting screen of the terminal device may be selected as the target object. As shown in FIG. 8, a plane 6 and a flying bird 7 are in the picture 2 to be photographed, and a currently focus area is 8, so the selected target object is the flying bird in FIG. 8.

In step 402, the moving speeds of the target object are respectively obtained during multiple instances.

In step 403, a preset speed range is calculated according to the moving speeds of the object obtained during the multiple instances.

In step 404, it is determined whether a moving speed falls into the preset speed range.

If the moving speed falls into the preset speed range, then in step 405, the camera of the terminal device focuses on the described object. Otherwise, the process ends.

The method provided by this embodiment of the present disclosure can select the target object from multiple objects on the shooting screen, and determines the preset speed range according to the moving speeds of the object obtained during multiple instances, which can continuously focus on one object on the shooting screen.

In the above methods in the embodiments of the present disclosure, when focusing on an object, a camera lens of the terminal device can be controlled to rotate relative to the terminal device, or the terminal device can be controlled to move relative to the object.

In an embodiment, the step of focusing on the object by rotating the camera lens may be performed in the following manners.

At first, a rotation direction and a rotation distance of the camera lens of the terminal device relative to the terminal device are calculated according to the moving speed.

In actual implementation, a corresponding relation between the moving speeds and the rotation direction and the rotation distance can be set in advance, and then in this step the rotation direction and the rotation distance can be calculated by table look-up. Of course, a formula also can be set in advance, and the rotation direction and the rotation distance can be calculated by inputting the moving speed into the formula.

With the increase of the moving speed of the object, the rotation distance of the camera lens will also increase.

Afterward, the camera lens is controlled to rotate relative to the terminal device according to the calculated rotation direction and the rotation distance.

In another embodiment, the step of focusing on the object by moving the terminal device may be performed in the following manners.

At first, a movement direction and a movement distance of the terminal device relative to the object are calculated according to the moving speed.

With the increase of the moving speed of the object, the movement distance of the terminal device relative to the object will also increase.

Afterward, the terminal device is controlled to move relative to the object according to the calculated movement direction and the movement distance.

In each above method embodiment disclosed in the present disclosure, same steps can learn from each other, different steps can be freely combined, and the results from the combination also belongs to the scope of protection of the present disclosure.

Figure 9:
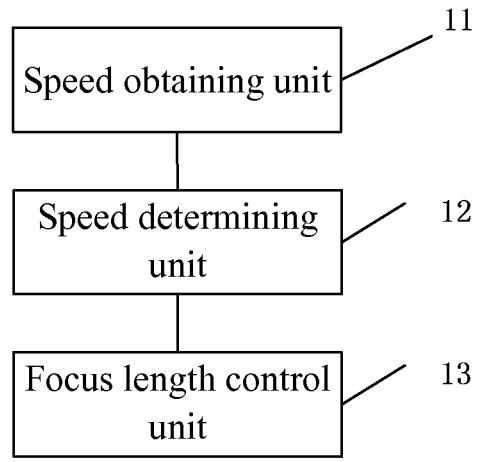
FIG. 9 is a block diagram showing an apparatus for shooting control according to an exemplary embodiment.

FIG. 9 is a block diagram showing an apparatus for shooting control according to an exemplary embodiment. Referring to FIG. 9, the apparatus includes a speed obtaining unit 11, a speed determining unit 12 and a focus length control unit 13.

The speed obtaining unit 11 is configured to obtain a moving speed of an object on a shooting screen of a terminal device.

In this embodiment of the present disclosure, the speed obtaining unit 11 can include a speed receiver sub-unit, a shift speed calculation sub-unit or a speed calculation sub-unit.

Wherein, the speed receiver sub-unit is configured to receive a moving speed of an entity corresponding to the object measured by a velocity measurement equipment.

A shift speed calculation sub-unit is configured to calculate a shift speed of the object on the shooting screen, which is taken as the moving speed.

The speed calculation sub-unit is configured to calculate the shift speed of the object on the shooting screen; to acquire the distance between the entity corresponding to the object and the terminal device; and to calculate the moving speed of the object according to the shift speed and the distance.

The speed determining unit 12 is configured to determine whether the moving speed falls within a preset speed range.

The focus length control unit 13 is configured to focus on the object if the moving speed falls within the preset speed range.

In an embodiment of the present disclosure, the focus length control unit 13 includes a rotation parameter calculation sub-unit and a rotation control sub-unit.

The rotation parameter calculation sub-unit is configured to calculate a rotation direction and a rotation distance of a camera lens of the terminal device relative to the terminal device.

The rotation control sub-unit is configured to control the camera lens of the terminal device to rotate relative to the terminal device according to the calculated rotation direction and the rotation distance.

In another embodiment, the focus length control unit 13 includes a movement parameter calculation sub-unit and a movement control sub-unit.

The movement parameter calculation sub-unit is configured to calculate a movement direction and a movement distance of the terminal device relative to the object.

The movement control sub-unit is configured to control the terminal device to move relative to the object according to the calculated movement direction and the movement distance.

The apparatus provided by the embodiment of the present disclosure obtains the moving speed of the object in the picture, determines whether the moving speed is within a preset speed range, and focus on the object on the shooting screen when the speed within the preset speed range.

Given that this apparatus can take advantage of the moving speed of the object in the screen as a feedback, and controls a focus process, a camera in the terminal device can automatically follow the object and focus on the object, which makes the focus process more automated and less time consuming.

Compared with related technology, because the focus process takes less time, the camera of the terminal device can capture quality images or scenes promptly during the movement of the object to be photographed.

Figure 10:
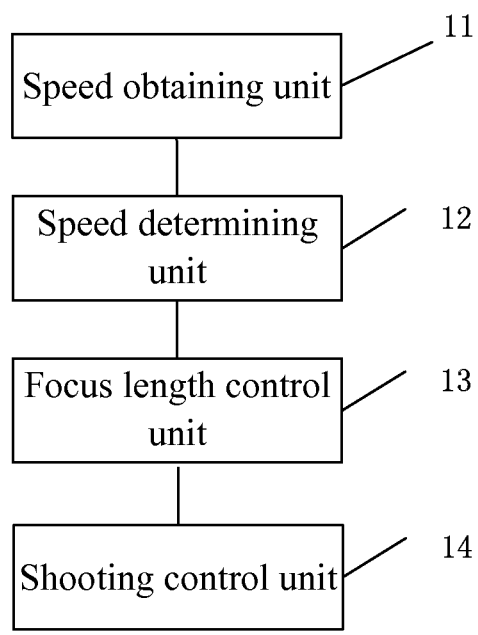
FIG. 10 is a block diagram showing an apparatus for shooting control according to another exemplary embodiment.

In another embodiment of the present disclosure, as shown in FIG. 10, the apparatus may further include a shooting control unit 14.

The shooting control unit 14 is configured to capture photos or videos of the object, after focusing on it.

In the above embodiment, although focusing on the object is completed and the best image or scene during the movement of the object is captured, but as for photographing, only a preparation stage is finished. So after the above steps, there is also a need to capture photos or videos for the object after the object is focused, so that the best image or scene during the movement of the object can be recorded.

In another embodiment of the present disclosure, the apparatus can further include an identification unit and a category determining unit.

The identification unit is configured to identify a category of the object.

The category determining unit is configured to determine whether the category of the object is a preset category.

If the category of the object is the preset category, the focus length control unit 13 focuses on the object.

The apparatus provided by this embodiment of the present disclosure can further identify the category of the object if there are multiple objects of which the moving speeds all meet the requirement on the shooting screen, and focus on the object only with the categories in the preset category, so as to make the focus length be more accurately.

In the above embodiments, the preset speed range is set in advance by a user. In the embodiments of the present disclosure, the moving speed of the object on the shooting screen can also be recorded continuously to calculate the preset speed range according to the moving speeds of the object in multiple records. Therefore, in another embodiment of the present disclosure, the apparatus can further include a first moving speed record unit and a first preset speed range obtaining unit.

The first moving speed record unit is configured to respectively record the moving speeds of the object during multiple instances.

The first preset speed range obtaining unit is configured to obtain a preset speed range according to the moving speeds of the object obtained during the multiple instances.

When there is more than one object on the shooting screen of the terminal device, if the method in the above embodiment is implemented, it is necessary to record the moving speeds of the multiple objects, and it is hard to focus on a certain object. Therefore, in another embodiment of the present disclosure, the apparatus can further include a target object selection unit, a second moving speed record unit and a second preset speed range obtaining unit.

The target object selection unit is configured to select a target object from multiple objects on the shooting screen of the terminal device.

In the embodiments of the present disclosure, the target object selection unit can include a selection sub-unit, which is configured to select a currently focused on the shooting screen of the terminal device as the target object.

The second moving speed record unit is configured to respectively record moving speeds of the target object during multiple instances.

The second preset speed range obtaining unit is configured to obtain a preset speed range according to the moving speeds of the target object obtained during the multiple instances.

The apparatus provided by this embodiment of the present disclosure can select the target object from multiple objects on the shooting screen and determine the preset speed range according to the moving speeds of the object obtained during the multiple instances, which can continuously focus on one object in the picture.

As to the apparatuses in the above embodiments, the specific operation method of each module has been described in detail in the corresponding method embodiments, the description of which is not repeated here.

Figure 11:
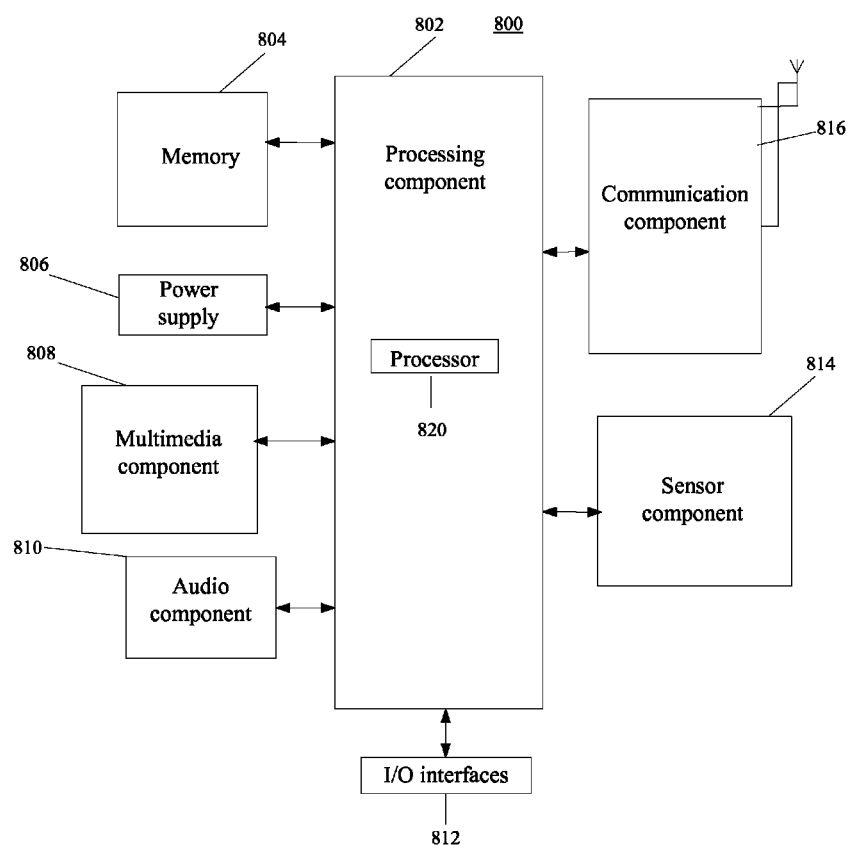
FIG. 11 is a block diagram showing a terminal device according to an exemplary embodiment.

FIG. 11 is a block diagram showing a terminal device according to another exemplary embodiment. For example, the terminal device may be a mobile phone, a computer, a digital broadcasting terminal device, a message transceiver, a game controller, a tablet device, a medical equipment, a fitness equipment or a personal digital assistant (PDA) etc.

Referring FIG. 11, the terminal device 800 may include following one or more components: a processing component 802, a memory 804, a power supply 806, a multimedia component 808, an audio component 810, input/output (I/O) interfaces 812, a sensor component 814 and a communication component 816.

The processing component 802 usually controls the overall operations of the terminal device 800, such as the operations associated with display, phone calls, data communication, camera operation and record. The processing component 802 may include one or more processor 802 to execute instructions, to complete all or part of the steps of the above method. In addition, the processing unit 802 may include one or more modules, to facilitate the interaction between the processing component 802 and the other components. For example, the processing component 802 may include a multimedia module, to facilitate the interaction between the multimedia component 808 and the processing component 802.

The memory 804 is configured to store various types of data to support the operation of the terminal device 800. The examples of the data include the instructions of any application or method operated in the terminal device 800, contact data, address book data, messages, pictures and video, etc. The memory 804 may be any type of volatile or non-volatile storage device or their combinations, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or a light disk.

The power supply component 806 provides power for various components of the terminal device 800. The power supply component 806 may include a power management system, one or more power supplies, and other components associated with generation, management and allocation of electricity for terminal device 800.

The multimedia component 808 includes a screen as an output interface provided between the terminal device 800 and users. In some embodiments, the screen may include a liquid crystal display (LCD) and a touch panel (TP). If the screen includes a touch panel, it may be implemented as a touch screen used to receive the input signal from users. The touch panel includes one or more touch sensors used to sense a touch, a slide or a gesture on the touch panel. The touch sensors may not only sense the boundaries of the touch or slide operation, but also detect the time of duration and the pressure associated with the touch or slide operation. In some embodiments, the multimedia component 800 includes a preposed camera and/or a postpose camera. When the terminal device 800 is in an operation mode, such as photographing mode or video mode, the preposed camera and/or the postpose camera may receive outer multimedia data. The preposed camera and the postpose camera may a fixed optical lens systems or have a focus length and the optical zoom capability.

The audio component 810 is configured to output and/or input audio signals. For example, the audio component 810 includes a microphone (MIC). When the terminal device is in an operation mode, such as the calling mode, the recording mode or a voice recognition mode, the microphone is configured to receive the outer audio signals. The received audio signals may be further stored in the memory 804 or transmitted by the communication component 816. In some embodiments, the audio component 810 further includes a loudspeaker used to output the audio signals.

I/O interfaces 812 are configured to provide interfaces between the processing component 802 and external interface modules, which may be a keyboard, a click wheel, buttons etc. These buttons may include but not limited to a home button, volume buttons, a start button and a lock button.

The sensor component 814 includes one or more sensors used to provide various aspects of condition assessment for the terminal device 800. The sensor component 814, for example, may detect the on/off state of the terminal device 800, relative position of the components, such as a display and a keypad of the terminal device 800, the sensor component 814 may also detect the position change of the terminal device 800 or one component of the terminal device 800, whether the touch between the user and the terminal device 800 exists or not, the orientation or acceleration/deceleration of the terminal device 800 and the temperature change of the terminal device 800. The sensor component 814 may include a proximity sensor which is configured to detect near objects without any physical contact. The sensor component 814 may also include light sensors, such as CMOS or CCD image sensor, used in the imaging applications. In some embodiments, the sensor component 814 may also include acceleration sensors, gyroscope sensors, magnetic sensors, pressure sensors or temperature sensors.

The communication component 816 is configured to facilitate the wired or wireless communications between the terminal device 800 and other devices. The terminal device 800 can access to a wireless network based on a communication standard, such as WiFi, 2G or 3G, or their combinations. In an exemplary embodiment, the communication component 816 receives radio signals from external radio management system or broadcast information via a broadcast channel. In an exemplary embodiment, the communication component 816 also includes a near field communication (NFC) module, so as to promote the short-range communication. For example, the NFC module can be implemented based on radio frequency identification (RFID) technology, infrared data association (IrDA) technology, the ultra-wideband (UWB) technology, Bluetooth (BT) technology and other technologies.

In an exemplary embodiment, the terminal device 800 may be implemented based on one or more application specific integrated circuits (ASIC), digital signal processor (DSP), digital signal processing device (DSPD), programmable logic device (PLD) and field programmable gate array (FPGA), controller, microcontroller, microprocessor and other electronic components used to perform the above methods.

In the exemplary embodiment, it further provides a non-temporary computer readable storage medium including instructions, such as the memory 804 including instructions, which can be performed by the processor 820 of the terminal device 800 to complete the above methods. For example, the non-temporary computer readable storage medium may be a ROM, a random access memory (RAM), a CD-ROM, a tape, a floppy disk and an optical data storage device, etc.

A non-temporary computer readable storage medium is provided, when the instructions in the storage medium are carried out by the processor of terminal devices to make the terminal device perform a kind of method for shooting control, and the method includes: obtaining a moving speed of an object on a shooting screen of the terminal device; determining whether the moving speed falls within a preset speed range; focusing on the object if the moving speed falls into the preset speed range.

Those skilled in the art may find other embodiments of the present disclosure after considering the specification and implementing the invention disclosed here. The present application is aimed at covering any variant or adaptive modification of the present disclosure, which correspond to the general principle of the present disclosure and include common knowledge or conventional technical means in the art not disclosed by the present disclosure. The specification and the embodiments are only exemplary, and the real scope and concept of the invention are described by the following claims.

It should be understood that the precise structures described above and shown in the drawings are not intended to limit the present disclosure, and various modifications and equivalents improvements can be made within the scope of the present disclosure, which is limited by the attached claims.

What is claimed is:

1. A method for shooting control in a terminal device, comprising:
   obtaining a moving speed of an object on a shooting screen of the terminal device;
   determining whether the moving speed is within a preset speed range, wherein the preset speed range is obtained by: recording moving speeds of the object during multiple instances respectively, and calculating the preset speed range according to the moving speeds of the object obtained during the multiple instances; and
   focusing on the object if the moving speed is within the preset speed range.

2. The method according to claim 1, wherein the method further comprises:

capturing a photo or a video of the object after focusing on the object.

3. The method according to claim 1, further comprising:
identifying a category of the object;
determining whether the category of the object is a preset category; and
focusing on the object if the category of the object is the preset category.

4. The method according to claim 1, wherein the shooting screen of the terminal device includes a plurality of objects, and the method further comprises:
selecting a target object from the plurality of objects on the shooting screen of the terminal device;
obtaining moving speeds of the target object during multiple instances respectively; and
calculating a preset speed range according to the moving speeds of the object obtained during the multiple instances.

5. The method according to claim 4, wherein selecting the target object from the plurality of objects on the shooting screen of the terminal device comprises:
selecting a currently focused object on the shooting screen of the terminal device as the target object.

6. The method according to claim 1, wherein obtaining the moving speed of the object on the shooting screen of the terminal device comprises:
receiving a moving speed of an entity corresponding to the object measured by a velocity measurement.

7. The method according to claim 1, wherein obtaining the moving speed of the object on the shooting screen of the terminal device comprises:
calculating a shift speed of the object on the shooting screen; and
taking the shift speed as the moving speed of the object.

8. The method according to claim 1, wherein obtaining the moving speed of the object on the shooting screen of the terminal device comprises:
calculating a shift speed of the object on the shooting screen;
obtaining the distance between an entity corresponding to the object and the terminal device; and
calculating the moving speed of the object according to the shift speed and the distance.

9. The method according to claim 1, wherein focusing on the object comprises:
calculating a rotation direction and a rotation distance of a camera lens of the terminal device relative to the terminal device according to the moving speed; and
controlling the camera lens to rotate relative to the terminal device according to the calculated rotation direction and the rotation distance.

10. The method according to claim 1, wherein focusing on the object comprises:
calculating a moving direction and a moving distance of the terminal device relative to the object according to the moving speed; and
controlling the terminal device to move relative to the object according to the calculated moving direction and the moving distance.

11. A terminal device, comprises:
a processor; and
a memory used to store performable instructions of the processor;
wherein the processor is configured to perform:
obtaining a moving speed of an object on a shooting screen of the terminal device;
determining whether the moving speed is within a preset speed range, wherein the preset speed range is obtained by: recording moving speeds of the object during multiple instances respectively, and calculating the preset speed range according to the moving speeds of the object obtained during the multiple instances; and
focusing on the object if the moving speed is within the preset speed range.

12. The terminal device according to claim 11, wherein the processor is further configured to perform:
capturing a photo or a video of the object after focusing on the object.

13. The terminal device according to claim 11, the processor is further configured to perform:
identifying a category of the object;
determining whether the category of the object is a preset category; and
focusing on the object if the category of the object is the preset category.

14. The terminal device according to claim 11, wherein the shooting screen of the terminal device includes a plurality of objects, and the processor is further configured to perform:
selecting a target object from the plurality of objects on the shooting screen of the terminal device;
obtaining moving speeds of the target object during multiple instances respectively; and
calculating a preset speed range according to the moving speeds of the object obtained during the multiple instances.

15. The terminal device according to claim 14, wherein selecting the target object from the plurality of objects on the shooting screen of the terminal device comprises:
selecting a currently focused object on the shooting screen of the terminal device as the target object.

16. The terminal device according to claim 11, wherein obtaining the moving speed of the object on the shooting screen of the terminal device comprises:
receiving a moving speed of an entity corresponding to the object measured by a velocity measurement.

17. The terminal device according to claim 11, wherein obtaining the moving speed of the object on the shooting screen of the terminal device comprises:
calculating a shift speed of the object on the shooting screen; and
taking the shift speed as the moving speed of the object.

18. A non-transitory computer-readable storage medium having stored therein instructions that, when executed by a processor of a terminal device, causes the terminal device to perform a method for shooting control, the method comprising:
obtaining a moving speed of an object on a shooting screen of the terminal device;
determining whether the moving speed is within a preset speed range, wherein the preset speed range is obtained by: recording moving speeds of the object during multiple instances respectively, and calculating the preset speed range according to the moving speeds of the object obtained during the multiple instances; and
focusing on the object if the moving speed is within the preset speed range.

* * * * *